United States Patent [19]

Feeney et al.

[11] Patent Number: 5,126,152

[45] Date of Patent: Jun. 30, 1992

[54] METHOD OF COATING FOODS WITH AN EDIBLE OIL BARRIER FILM AND PRODUCT THEREOF

[75] Inventors: Robert D. Feeney, Scituate; Stephen G. Haralampu, Plymouth; Akiva Gross, Newton, all of Mass.

[73] Assignee: Opta Food Ingredients, Inc., Cambridge, Mass.

[21] Appl. No.: 663,411

[22] Filed: Mar. 1, 1991

[51] Int. Cl.$^5$ ............................................. A23L 1/217
[52] U.S. Cl. .................................. 426/102; 426/302; 426/438; 426/637
[58] Field of Search ................. 426/89, 96, 102, 302, 426/438, 637, 654

[56] References Cited

U.S. PATENT DOCUMENTS

| | | |
|---|---|---|
| 2,311,485 | 2/1943 | Sturken . |
| 2,377,237 | 5/1945 | James . |
| 2,475,133 | 7/1949 | Furter et al. . |
| 2,791,509 | 5/1957 | Cosler ................................ 426/302 |
| 3,424,591 | 1/1969 | Gold ..................................... 426/102 |
| 3,479,191 | 11/1969 | Cole . |
| 3,650,776 | 3/1972 | Tschirgi ............................... 426/102 |
| 3,653,925 | 4/1972 | Anker et al. .......................... 426/302 |
| 3,840,676 | 10/1974 | Yamamoto et al. ................... 426/89 |
| 3,991,218 | 11/1976 | Earle et al. ........................... 426/250 |
| 4,066,796 | 1/1978 | McKee ................................. 426/302 |
| 4,283,425 | 8/1981 | Yuan et al. ....................... 426/637 X |
| 4,293,572 | 10/1981 | Silva et al. ............................ 426/19 |
| 4,543,370 | 9/1985 | Porter et al. ......................... 523/100 |
| 4,820,533 | 4/1989 | Seaborne et al. ..................... 426/76 |
| 4,917,908 | 4/1990 | Prosise ............................ 426/637 X |
| 5,019,403 | 5/1991 | Krochta ................................ 426/89 |
| 5,021,248 | 6/1991 | Stark et al. ........................... 426/96 |

FOREIGN PATENT DOCUMENTS

WO80/00659  4/1980  PCT Int'l Appl. .

*Primary Examiner*—Arthur L. Corbin
*Attorney, Agent, or Firm*—Hamilton, Brook, Smith & Reynolds

[57] ABSTRACT

A method is described for reducing the amount of oil absorbed into a food during hot oil frying. The method involves coating the food, prior to deep fat frying with a protein latex which forms a layer of hydrophobic protein having excellent barrier properties to hot oil.

22 Claims, No Drawings

METHOD OF COATING FOODS WITH AN EDIBLE OIL BARRIER FILM AND PRODUCT THEREOF

BACKGROUND OF THE INVENTION

The food industry is attempting to produce foods that are both high quality and have reduced fat and/or reduced calories. A prime target category is the entire family of fried foods, and particularly deep-fat french-fried potatoes.

French-fried potatoes, for example are generally prepared from sliced raw potatoes that have been subjected to heat pretreatment, followed by a direct contact deep fat frying process at high temperature. Depending upon the exact nature of the pretreatments, a significant quantity of oil is taken up by the potato during the frying process.

Certain technologies have appeared in practice promising oil reduction, but do not provide acceptable levels of quality in the finished product. Among these are spraying partially fried potatoes with high melting triglyceride solids for oven baking as an imitation for deep-fat frying. This method produces fries having a quality texturally and hedonically different from their deep-fat fried analogues. Variations in drying conditions just prior to the par frying step allow for reduced oil fries, but with the penalty of poor eating quality and a chewier or harder texture. This is a result of the significantly lower moisture content caused by over drying the fried potato strips.

In U.S. Pat. No. 4,906,483, Kloos describes a process in which the potatoes are formed into slices, in the form of either potato chips or french fries, and subjected to hot water treatment for the removal of starch and the generation of color. Following this set of operations, the potatoes are placed on a nonstick cookie sheet and baked to a predetermined color end point.

In U.S. Pat. No. 4,542,030, Haury and Hensley describe a process in which potato slices are dipped in a solution containing sodium acid pyrophosphate (SAPP) and caramel and/or glucose. Following the dipping and blanching operations, the potato strips are subjected to a brief air drying step and then either to deep-fat frying or hot oil spraying. Part of the oil reduction is claimed to result from a combination of high temperature and short cooking time or low temperature and extended cooking time. Freezing follows the par-frying step. The potatoes are finished by a baking process.

In U.S. Pat. No. 3,865,964 Kellermeier et al. describe a process in which potatoes are washed, peeled, sliced and blanched followed by conventional par-frying in hot oil, and freezing. Following freezing, the fried potatoes are spraying with a controlled amount of frying fat in globule form, which solidifies on contact with the cold surface. For final consumption the fries are thawed and baked.

In U.S. Pat. No. 4,917,908 Prosise describes a process in which potatoes are coated with polyvinylpyrrolidone, acting as an oil barrier. In the described process the potatoes are sliced, washed and dipped into either water or a solution of polyvinylpyrrolidone for 10 minutes Following this, the potatoes are deep fried. An oil reduction figure of 28% is given, but the neither the described process nor the control process reflect the state of the art in the retail food industry, which often involves multiple blanching steps and both a par- and finish frying step.

In U.S. Pat. No. 3,846,572, Nonaka et al. describe a process in which reduced fat french fries are prepared. Raw potato slices are frozen in dichlorodifluoromethane, leached in water, fried and subsequently washed again in oil-free dichlorodifluoromethane. Both the Nonaka and the Prosise methods are associated with non-natural chemical additives, which are not acceptable to either consumers at large or the retail food industry.

A process for producing low-fat potato chips is discussed in U.S. Pat. No. 4,283,425 by Birney and Yuan. Specifically aimed at potato chips their process involves coating a raw sliced potato with a globular protein, adding a layer of oil over the protein and subjecting the slice to microwave heating.

Proteins have been used as oil barrier coatings in some applications. Solutions of prolamines for example have been used in food systems such as candy coatings. Use of prolamine coatings is described by James in U.S. Pat. No. 2,377,237; by Cosler in U.S. Pat. No. 2,791,509; and by Anker et al. in U.S. Pat. No. 3,653,925. All previous applications utilizing prolamines, however, have been made from non-aqueous solvents, such as ethanol.

None of the available methods results in a product having acceptable sensory quality and a significantly reduced fat content.

SUMMARY OF THE INVENTION

The present invention provides a method for producing edible oil barriers which can be used to block or hinder the flow of hot oil into a food during an oil-frying process. An edible oil barrier film is produced by the controlled application to the food of an aqueous-based latex containing a hydrophobic protein. The latex is applied to the food during the preparatory stages of the food processing operation, and is set by external heat during the drying and/or par-frying steps which are a part of many food processing operations. The resulting coating is a coherent protein film which provides an effective barrier to hot oil during frying.

In the present method, the latex containing a hydrophobic protein is applied to the food. Hydrophobic proteins which are particularly useful are a class of proteins known as prolamines. The latex can, optionally, include other materials, such as surfactant or stabilizing agents.

Methods of producing the edible film, as well as the method of application of the edible film, are the subjects of the present invention. In one embodiment of the method, the coating is applied to sliced potatoes in one step, during either a first or primary blanching bath, or in a subsequent blanching bath solely designated to the purpose of introducing the protein latex to the potato slice. This method involves the application of the protein latex during prolonged exposure to a hot water bath at moderate temperature.

In another embodiment of the present method, the protein latex solution is applied to the food during the drying stage, in the form of a mist or spray. During the spraying, external heat may be applied to set the film, or the internal heat of the potato slice, or other food, can be used to set the film. The total drying time is a function of the mass of the potato slices to be dried the temperature and humidity of the drying air stream, and the target moisture or texture for the food. The spray can be applied at any point during the drying process, but is generally applied at a time representing approximately 10 to 50% of the drying time, most often at approximately 20% of the drying time so as not to inhibit moisture removal.

In another embodiment, the above methods are combined in such a way that the food e.g., potato slices, are blanched and dipped in a first protein latex coating material, and then are dried and spayed with a second protein latex coating material. In practice, the first and second coating materials can be, but do not necessarily have to be, the same. For example, the first coating material can be a latex having a protein/hydrocolloid ratio different than that of the second coating material in the spray application. Another embodiment of the method involves a sequential dipping—drying—dipping process, in which a potato slice or other food is blanched and then dipped into the protein latex, followed by a very short duration air drying step. This air drying step combines a surface drying effect with preliminary film coverage. The partial air drying step is followed by a second dip in a coating material, followed finally by a standard drying process step.

In these methods, the protein coatings and their method of application endow the fried food with significant advantages over fried foods prepared conventionally, or prepared in other ways to reduce oil. Primarily, the finished fried foods produced according to the present method display an absorbed oil content that is between 20 and 40% below that of conventially prepared fried foods (that is, without a barrier coating), while maintaining approximately the same finished moisture content. The appearance of the fried food is identical to conventionally prepared foods, and the in-mouth texture is described as nearly identical to, but less oily than, conventionally prepared fried foods. The protein coating itself is not discernable, and does not affect the eating or tasting characteristics of the finished product.

Fried foods prepared according to the present method retain the organoleptic qualities of their higher fat analogues. This adds an advantage to food outlet chains for example, desiring to use this technology; the barrier coating can be formed easily and with currently used equipment, and the coated materials can be handled and processed using current conventional methods. For example, standard french fry production processes can be adapted to allow the deposition of the present protein-based edible coating. The oil-barrier formed by the hydrophobic protein coating exhibits effective oil transport and oil absorption barrier properties, resulting in a fried product having significantly less oil absorbed during frying than the non-coated food.

DETAILED DESCRIPTION OF THE INVENTION

The invention relates to an edible barrier the function of which is to prevent the absorption of excess oil during the preparation of fried foods. The invention further relates to the specific methods of applying the edible film to foods in a process for manufacturing deep fried food products.

The method involves applying to a food prior to frying an aqueous latex comprising a hydrophobic, film-forming protein in an aqueous medium. The aqueous hydrophobic protein latex forms a durable film when deposited and set on the surface of the food and dried The hydrophobic protein film can withstand the extreme conditions of frying with sufficient integrity to form an effective barrier against absorption or diffusion of the hot frying oil into the food.

The term "latex" as used herein means a suspension of water-insoluble particles of hydrophobic protein having a mean volume diameter of about 30 microns or less also referred to herein as protein "microspheres", in an aqueous medium. The term "aqueous medium" refers to water or a water-based solution which contains at least 60% by weight water.

The present hydrophobic protein coatings prevent oil absorption into deep-fried foods. The primary mode of accomplishing this is by acting as a physical barrier to the cooking oil. Since on the rough surface of a food some imperfections in the coating can be expected, especially at locations where stream is liberated during frying, then an additional characteristic of the coating material should be its relative inability to be wetted by the oil, i.e., oil repellency. Treating this as a classical surface chemistry problem, this should define the types of materials to be considered for the coating, and indicates materials with relatively low interfacial tensions.

Assuming that oil is taken up by a food during frying by infiltration of the oil into the vacant capillaries of the food, then the oil uptake would follow a relationship of the form (Arthur W. Adamson. *Physical Chemistry of Surfaces*, 3rd ed., John Wiley & Sons N.Y.):

$$\Delta P = 2(\gamma_{SV} - \gamma_{SL})/r$$

where $\Delta P$ is the pressure driving fluid into the capillary. $\gamma_{SV}$ and $\gamma_{SL}$ are the interfacial tensions between the solid-vapor and solid-liquid, respectively, and r is the capillary radius. It can be seen from this relationship that to minimize the capillary absorption of oil, i.e., minimizing $\Delta P$, then $\gamma_{SV}$ should be small, and, if possible, $\gamma_{SL}$ should be large (assuming r cannot be changed by the coating). Typically, hydrophobic surfaces will possess low values of $\gamma_{SV}$, while this value is relatively higher for hydrophilic surfaces. It is for this reason that the use of hydrophobic proteins as the coating material is particularly suitable for this purpose.

Water-soluble, hydrophobic proteins derived from a variety of sources, including, animal and plant sources can be used to prepare the protein latices used in the present method. Water-insoluble hydrophobic proteins are proteins which, in their non-denatured state, are insoluble in water over a wide pH range (e.g., between about pH 2 to 10).

Hydrophobic proteins which are particularly useful in the present method are a class of hydrophobic grain proteins known as prolamines. Prolamines are found in high concentrations in various grains, such as corn, wheat, barley, rice and sorghum, and in other plant and animal sources. Prolamines are characterized by their insolubility in water and solubility in aqueous alcohol. Prolamines generally contain a large number of hydrophobic amino acids, such as proline, glutamine and asparagine. Prolamines include for example, zein, hordein, gliadin and kafirin.

Prolamine latices for use in the present methods can be made by dissolving the prolamine in a solvent, such as ethanol, and combining the prolamine solution with an aqueous medium under mixing conditions. Prolamines are not soluble in the water-rich mixture, and precipitate, thereby forming a latex. Substantially spherical microparticles are produced by this method. Prolamine latices and methods for making them are described in detail in co-pending U.S. patent application Ser. No. 07/403,111 by Stark and Gross, filed Sep. 1, 1989, now U.S. Pat. No. 5,021,248, the teachings of which are incorporated herein by reference. The latex can then be treated, e.g., by evaporation or diafiltration, to reduce the amount of prolamine solvent. The resulting prolamine latex is substantially free of organic solvent, that is, contains none or only trace amounts (e.g., less than 1% by weight) of organic solvent. When the latex is applied to a substrate of choice and the water is evaporated under conditions conductive to forming a film, a continuous prolamine film forms.

The preferred prolamine for use in the present method is the alcohol-soluble protein-fraction of corn (Zea mays), named zein. The potential yield of zein is about one pound per bushel of corn. Zein can be readily obtained from corn gluten, which is a by-product of the corn wet milling industry. Both commercially available grades, with associated impurities, and purified forms of zein can be used.

The concentration of prolamine particles in suspensions made by the precipitation process described is generally up to about 5% by weight. The suspension may be further concentrated to up to about 40% by weight, by ultrafiltration, evaporation or other appropriate technique, or reduced to a dry powder, using standard techniques such as flash drying, lyophilization or spray drying. For example, ultrafiltration using membranes having a cut-off of 300,000 NMWL (nominal molecular weight limit) or less is a preferred method of concentrating the suspension and, at the same time, removing low molecular weight compounds dissolved in the aqueous medium. The concentrated protein can be diafiltered to reduce the amount of residual prolamine solvent to trace amounts. The diafiltration can be done continuously by staged addition of water or in a batch mode by constant volume batch diafiltration.

Dehydration can be accomplished by any suitable process, e g., spray-drying or freeze-drying, which maintains the integrity of the microparticles. The dried preparation can then be resuspended to the desired solids concentration at the time of use by adding the appropriate amount of aqueous suspending medium and agitating the mixture under moderate to higher shear.

As an alternative to forming the latex via precipitation of the prolamine a suspension of prolamine in a predominantly aqueous medium can be made by milling the protein and mechanically dispersing it in the aqueous medium. The protein may be milled to a fine particle size of preferably less than about 20 microns, and more preferably less than about 15 microns in an appropriate apparatus, e.g., a pin mill, or fluid energy mill optionally using a particle size classification device, such as a cyclone separator, to isolate the ultrafine particles. The suspension may be made by adding the milled protein to water, or an aqueous medium, with agitation sufficient to individualize and suspend the particles. The ratio of protein to water will depend upon the concentration of the final reconstituted product which is desired. Additives in the aqueous medium may be used to enhance the properties of the suspension, and/or the resultant film.

The properties of the suspension can be modified for a given application, for example, by chemically and/or enzymatically altering the starting protein prior to precipitation or milling. Such modifications can produce a coating having enhanced barrier properties or mechanical stability. The functionality, surface properties and molecular weight distribution of the protein can be modified by hydrolysis with proteases, such as papain or chymotrypsin, to yield peptides having similar solubility characteristics as the untreated protein. Enzymatic hydrolysis can be carried out prior to making the suspension The degree of hydrolysis can be controlled by varying the amount of enzyme used, the temperature of the reaction mixture or the reaction time during which the protein is exposed to the enzyme. Enzymatic hydrolysis of zein in 90% ethanol using a protease (e.g., papain or chymotrypsin) yielded polypeptides with a molecular weight of about 1,000 daltons. Unmodified zein has a dimer molecular weight of about 38,000 daltons. More importantly the hydrolysate retains the solubility characteristics of the protein, i.e., the polypeptides are still insoluble in water but soluble in aqueous alcohol having at least 60% alcohol.

The properties of the barrier coating can be influenced by chemical modification of the proteins. Such modifications can include, for example, treating the proteins with an acid, base or other agent which alters the structure of one or more of the amino acid side chains which, in turn, alters the character of the protein. For example, the high glutamine and asparagine content of prolamines, particularly zein, provides a means for manipulating the charge characteristics of the protein by deamidation, thereby providing a wide range of hydrophobicity. The preferred deamidation method involves mild acid-catalyzed deamidation (at a pH of about 1) at elevated temperatures (e.g., 25°–65° C.) for a period of time sufficient to accomplish the desired level of deamidation. The deamidation process may be followed by measuring the release of ammonia with an ammonia electrode. Deamidation is controllable, and may be terminated by the addition of ammonium carbonate or other base. Other examples of chemical modification include esterification of the protein with fatty alcohols or acylation of the protein with fatty anhydrides.

Additives can be used to enhance certain properties of the films, such as the film barrier properties, film mechanical properties (e.g., tensile strength and flexibility), and to improve the flow and fusing of the latex particles to form a continuous film from the suspension. For example, glycerol, or polyethylene glycols can be used to plasticize the film. Composite film structures with complex properties can be formed by using other polymeric or film-forming additives, such as other proteins (e.g., gelatin or casein), hydrocolloids (e.g., gum arabic, carrageenan or xanthan) or synthetic polymers (e.g., polyethylene glycol). Stabilizing agents, such as carboxymethyl-cellulose, pectin, alginate salts, or konjac can be added to the latex. Flavors, colors, anti-oxidants and/or preservatives can also add useful function to the films. Additives which are soluble in water can be incorporated in the coating formulation by direct dissolution in the aqueous medium of the latex. Additives which are insoluble in water may be dispersed by surfactants and added as an emulsion or latex, or incorporated in the zein microspheres during the microshere precipitation process.

Water insoluble additives can be incorporated in the microspheres by dissolving or dispersing the additive in the alcoholic prolamine solution prior to the precipitation process in which the latex is formed. The additive, when incorporated in the prolamine microspheres, can be either evenly distributed throughout the sphere, in the center of the sphere or on the surface of the sphere, depending on the chemical nature of the additive. Alternatively the additive may form microspheres or droplets separate from the protein microspheres.

The edible coating or barrier can be applied to the food substrate of choice prior to deep frying by any suitable method, e.g., dipping spraying, brushing, etc. The protein latex is applied to the substrate and dried under moderate heat to evaporate the water, and cause the microparticles to fuse or coalesce into a continuous film. A temperature of at least 40° C. is generally used. Quickly raising the temperature of the film composition to above about 75° C., for example, has the effect of driving off the water and of causing the protein microspheres to flow and fuse into a continuous, transparent film. Heat is applied to the surface, such as via a radiant source, establishing a surface temperature of about 75° C. or above. The important feature of the curing process is to drive off the moisture in the coating at a sufficiently high temperature to allow the protein microspheres to flow into a continuous film while there is enough moisture remaining in the film to allow for plastic flow. The moisture content of the food is maintained at an acceptable level. If a zein dispersion is dried at a low temperature. e.g., room temperature, and then subjected to heat, establishing a surface temperature of about 100° C., a continuous, transparent film would not form.

The present method using a water-based prolamine latex has several advantages: the latex can be dried to form a stable dry product which can be readily reconstituted with water, or other aqueous medium, prior to use. The prolamine latex is stable under conditions of mild pH (e.g., about 2 to about 10). The preferred pH range for food applications is from about pH 5 to about pH 7. The latex forms a continuous, durable film upon curing which is colorless, odorless, bland to the taste and non-toxic. When applied to foods prior to frying in hot oil, the film forms an effective barrier to hot oil during the frying process.

The present method is particularly useful for preparing french fried potatoes, resulting in up to a 40% reduction in the amount of oil absorbed by the potato during deep-fat frying. The present method involves applying the prolamine latex to the potato slices and drying or heating the latex coating to form a coherent film. The term potato slice, as used herein, describes the result of a specific slicing operation on a raw potato, following peeling or rasping for skin removal. A piece of potato is forced through a cutting screen or die to produce numerous pieces whose geometries are typical of french fries as generally known. For example, their cross-sectional geometry could be between 5 and 10 millimeters on each side. These pieces might then be subjected to further division such that their overall length is restricted to between 5.0 and 8.0 centimeters. Of course, geometries outside these limits are feasible and sometimes encountered in practice. The overall size of the potato slice will not adversely affect the coating process. Special-effect slices, such as crinkle cut potatoes, are also good candidates for the aforementioned coating process and material.

In a general process used for the production of french-fried potatoes, the potato slices are subjected to a blanching process in hot water, at a temperature between 50 and 90° C. The immersion time in this blanching bath is between four and twelve minutes. A second blanch step is often performed immediately after the first blanch, primarily to introduce a sequestering agent, such as SAPP (sodium acid pyrophosphate) for cation (e.g., iron) removal, and/or to add back a controlled quantity of a reducing sugar to the potato slice. The reducing sugar is added if a specific color range in finished product is desired. For the second blanch step, the temperature is generally between 65 and 75° C., and the immersion time is between ten seconds and one minute.

At this point, the potato slices are subjected to forced air drying. The duration of the drying step is such that a mass loss of about 15–30% occurs. The mass loss is substantially a water loss. Upon completion of the drying step the sliced potato pieces are allowed to equilibrate at room temperature for between 1 and 10 minutes. Upon completion of this residence time, the sliced potato pieces are partially fried (par-fried) in a suitable shortening for between 45 and 60 seconds, at a temperature between about 170° and 200° C. Upon completion of the par-frying step, the sliced potatoes are removed from the hot oil, shaken gently to remove excess oil and quickly frozen. Frozen storage is maintained for an undetermined period of time, whose lower boundary is simply the minimum time required for the sliced, par-fried potatoes to completely freeze. The final step is the finish frying, which occurs in hot deep fat, generally just prior to consumption. In this step, the frozen sliced par-fried potatoes are immersed into hot oil, whose temperature is between about 170° C. and 200° C. The frying time is between two and three minutes.

The amount of oil absorbed by the potato slices during this process was analyzed by a hexane extraction of the fats absorbed by the french fried potatoes during the frying process. A weighed sample of the french fries was placed in an appropriate receiving vessel, mixed with hexane and ground. The mixture was allowed to stir for several hours (approximately 3–5 hours). The potato residue was filtered from the hexane solution, and washed several times with fresh hexane. The hexane was evaporated and the quantity of oil residue was determined gravimetrically. When the process was performed under standard conditions (with no coating application), a "control" value for oil residue was determined An experimental value was determined when the coating was applied For accurate determinations of relative oil retention. "control" and "experimental" potato slices were fried side-by-side in a compartmented frying basket.

The hydrophobic protein coating may be applied at any convenient point in the process for the production of an edible barrier. For example, the barrier may be added during any of the blanching or dipping steps in the process. The latex preferably contains between about 5% by weight to about 10% by weight protein for this purpose. The potato slices can be coated by dipping the potatoes in the protein latex, by brushing them with the latex, or by any other suitable procedure. The coating protein is then "fused" and set during a drying step, often using hot dry air flowing in a stream over or through the mass of the potato slices, thereby forming a coherent film. Alternatively, the film may be set in the hot oil. The oil impermeable properties of the barrier is established during the first oil frying step, in which the protein film acts to hinder or block the flow of oil into the interior of the potato.

Alternatively, the coating may be applied by spraying the food with the aqueous protein latex. The spray can be applied at any point during the process. For example, if the potato slices are processed conventionally, the spray can be added at some time during the drying operation, in order to take advantage of the application of the dry heat.

Edible protein coatings produced by the present method are clear films which are non-toxic since they are formed from common food proteins. The protein coatings provide effective barrier properties against hot oil, i.e., at a temperature used for deep fat frying. The protein coating effectively reduces the amount of the hot oil which is absorbed into the food during the frying process. Thus, fried foods which are coated with a film formed from the present protein latex prior to frying absorbs substantially less oil than the same untreated food, resulting in lower-fat, lower-calorie food product which retains the eating characteristics associated with fried foods.

EXAMPLES

Example 1

Standard, healthy, well-preserved Idaho Russett potatoes were peeled, washed and formed into a french fry shape whose geometry was 9×9 millimeters in cross section and between 50 and 80 millimeters in length. Sections falling outside these limits were discarded.

Approximately 370 grams of these sliced potatoes were selected and processed as follows. After washing and selection, the potato slices were blanched in a 10% aqueous zein latex solution for eight minutes at 74.C. On a solids basis, the zein latex had the composition 94.06% zein protein. 4.95% carboxymethylcellulose, 0.693% vegetable oil, 0.30% lecithin (Yelkin YS). The latex was prepared from a dry mix assembled according to the teachings of Stark and Gross in U.S. patent application Ser. No. 07/403 111 filed Sep. 1, 1989, the teachings of which are hereby incorporated herein by reference. Following the first blanching step the potatoes were then moved to a second blanch bath for twenty seconds at 74° C. The composition of this bath was 0.75% SAPP (ADM Decatur, Ill.). and 1.00% dextrose in water. Immediately after the required blanching time, the fries were removed from the bath and allowed to drain and equilibrate at room temperature for five minutes. Following the equilibration period, the fries were then placed in a rotary drier under forced hot air for fifteen minutes, resulting in a 31% loss in mass due to moisture. The fries were then immediately par-fried in shortening at 185° C. for 50 seconds, drained and frozen at 0° F. The next day, the frozen french fries were finish-fried by placing the frozen material in shortening at 185° C. After about ten seconds, the basket was agitated to effect complete separation of the fries from the frozen central mass. Total frying time was two minutes and thirty seconds, following which the fries were removed from the oil drained and allowed to cool for about one minute.

Multiple samples were taken and subjected to an oil determination. The french fried potatoes were weighed, and transferred to a flask suitable for containing hexane. Approximately 150 mL hexane was added, and the hexane/potato mixture was ground to fine pulp using an homogenizer or high speed mixer, such as Silverson model L4R (Silverson Ltd., Waterside. Chesham; Bucks. England HP5 1PQ). Hexane was added to bring the volume to approximately 300 mL, and the flask was agitated with a magnetic stirrer for approximately 4 hours. The liquid hexane, was removed by filtration and the potato residue was washed with several volumes of warm hexane. All of the hexane was reserved, and was transferred quantitatively to a tared flask and evaporated. The resulting residue was weighed, yielding the weight of the oil residue extracted from the fried potatoes.

Zein coated potatoes analyzed according to this procedure yielded an oil content of 10.1% w/w. which compared to a control sample treated similarly, represents a 17% by weight reduction in oil content.

Example 2

Potatoes were prepared as described in Example 1. Approximately 387 grams of sliced potatoes were selected for processing. The potatoes were blanched in a zein latex bath identical in composition to that used in Example 1, for four minutes at 74° C., after which they were partially dried in a rotary drier, blanched again for 4 minutes in a 10% zein latex bath. The potatoes were then dipped for 20 seconds in SAPP/dextrose bath, and dried in a rotary drier until a weight reduction of 31% was achieved. Uncoated potatoes were used as a control, and were treated to the same steps but were blanched in an aqueous bath, which did not contain zein. The potatoes were allowed to equilibrate at room temperature for five minutes, and then par fried for fifty seconds at 185° C. The potatoes were frozen and finish-fried as described in Example 1. The sample was analyzed for oil absorption according to the hexane extraction method and showed a 31% by weight reduction in the amount of oil absorbed compared to the control fries.

Example 3

Potato samples were prepared as described in Example 1. A 252 gram sample of potato slices were chosen for processing. The potato slices were washed and blanched in hot water (74° C.) for eight minutes, followed by a 20 second immersion in the SAPP/dextrose blanch bath at 74° C., after which the sample was placed in a rotary drier for 13 minutes. At two minutes and 36 seconds into the drying time. 15.0 mL of a 5% zein latex solution (composition from Example 1, at 5% aqueous w/w) was sprayed into the drying cavity. The weight loss after drying was 25.2%. Upon completion of 13 minutes of drying time, the sample was allowed to equilibrate for 5 minutes at room temperature. Following the par frying and freezing, steps as described in Example 1 above the samples were finish-fried the following day, and analyzed for oil content. Control samples were treated similarly except that the zein spray was omitted. The sample sprayed with zein latex during the drying cycle displayed an oil reduction of 8.2% by weight compared to the untreated control fries.

Example 4

A sample of potatoes was sprayed with 15.0 mL of zein latex solution at 7 min 48 sec into the 13 minute drying cycle, according to the procedure described in Example 3. The potatoes displayed a 26% mass loss out of the drier. The potatoes were par-fried, frozen and finish-fried, and the oil content, determined all according to the procedure described in Example 1. The zein-treated fries displayed an oil reduction of 6.6% by weight compared to the untreated fries.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. A method for reducing the amount of oil absorbed or diffused into a food during cooking in oil comprising coating the food with an aqueous latex suspension consisting essentially of water-insoluble hydrophobic protein microspheres which have a mean volume diameter of about 30 microns or less and drying the coating under conditions sufficient to cause a continuous protein oil barrier film to form.

2. The method of claim 1 wherein the hydrophobic protein comprises a prolamine.

3. The method of claim 2 wherein the prolamine is selected from the group consisting of: zein, kafirin, gliadin and hordein.

4. The method of claim 1 wherein the latex contains up to about 40% by weight of the hydrophobic protein.

5. The method of claim 4 wherein the latex contains from about 5% by weight to about 25% by weight of the hydrophobic protein 6. The method of claim 1 wherein the food is coated by dipping the food into the latex.

7. The method of claim 1 wherein the food is coated by spraying the food with the latex.

8. The method of claim 1 wherein the food comprises sliced potatoes.

9. A food product produced by the method of claim 1.

10. A food product produced by the method of claim 2.

11. A method for reducing the amount of oil absorbed by sliced potatoes during oil-frying comprising the steps of:
    a) coating the sliced potatoes with an aqueous latex suspension consisting essentially of water-insoluble hydrophobic protein microspheres which have a mean volume diameter of about 30 microns or less;
    b) drying the coating under conditions sufficient to cause the protein microspheres to fuse thereby forming a continuous protein oil barrier film; and
    c) contacting the coated potatoes with hot cooking oil.

12. The method of claim 11 wherein one or more blanching steps is performed prior to coating the potatoes with the latex.

13. The method of claim 11 wherein the potatoes are par fried prior to or subsequent to coating with the latex.

14. The method of claim 11 wherein the hydrophobic protein is a prolamine.

15. The method of claim 14 wherein the prolamine is selected from the group consisting of: zein, kafirin, gliadin and hordein.

16. A food product produced by the method of claim 14.

17. The method of claim 11 wherein the latex contains up to about 40% by weight of the hydrophobic protein.

18. The method of claim 17 wherein the latex contains from about 5% by weight to about 10% by weight of the hydrophobic protein.

19. The method of claim 11 wherein step (c) is performed by deep fat frying.

20. The method of claim 11 wherein the latex additionally contains a stabilizing agent or plasticizing agent.

21. The method of claim 11 wherein step (a) is performed by dipping, brushing or spraying.

22. A food product produced by the method of claim 11.